United States Patent [19]
Falk et al.

[11] Patent Number: 5,299,084
[45] Date of Patent: Mar. 29, 1994

[54] ROTARY HEAD DISC FOR A MAGNETIC-TAPE APPARATUS HAVING REPRODUCING HEADS SHIELDED FROM RECORDING HEADS

[75] Inventors: Gerhard Falk, Rossdorf; Hartmut Willmann, Gross-Zimmern, both of Fed. Rep. of Germany

[73] Assignee: U.S. Philips Corporation, New York, N.Y.

[21] Appl. No.: 861,682

[22] Filed: Apr. 1, 1992

[30] Foreign Application Priority Data
Apr. 2, 1991 [DE] Fed. Rep. of Germany ....... 4110589

[51] Int. Cl.⁵ .............................................. G11B 5/52
[52] U.S. Cl. ................................................... 360/107
[58] Field of Search .............................. 360/85, 107

[56] References Cited
U.S. PATENT DOCUMENTS
4,509,084 4/1985 Fujioka ............................. 360/107
5,130,875 7/1992 Ono .................................. 360/107

Primary Examiner—A. J. Heinz
Attorney, Agent, or Firm—Brian J. Wieghaus

[57] ABSTRACT

A scanning device for a magnetic-tape apparatus is proposed, which device comprises a stationary upper drum section (1) and lower drum section (2) and a head disc (10) which rotates in a gap (5) between the drum sections. In its upper radial surface and its lower radial surface the head disc (10) has segmental recesses (26, 27) for accommodating magnetic heads (11) secured to head mounts (12). At one side of the head disc (10) the recesses (26, 27) accommodate magnetic recording heads and at the other side said recesses accommodate the magnetic reproducing heads.

16 Claims, 2 Drawing Sheets

ROTARY HEAD DISC FOR A MAGNETIC-TAPE APPARATUS HAVING REPRODUCING HEADS SHIELDED FROM RECORDING HEADS

BACKGROUND OF THE INVENTION

The invention relates to a scanning device for a magnetic-tape apparatus of the type having a rotary head disc, rotatable about an axis of rotation and including a plurality of magnetic recording heads and a plurality of magnetic reproducing heads at the periphery of the disc.

A scanning device comprising a two-part tape-guide drum and a head disc rotating in the gap between the two parts is known from DE 12 30 779 B2. The head disc carries two magnetic heads at its periphery. The signal transfer to and from these magnetic heads is effected via planar rotary transformers. The lower and the upper side of the rotary head disc each carry one of the planar rotary transformers.

Moreover, DE 36 44 502 C2 describes a rotary magnetic-head arrangement for the recording and reproduction of signals, in which the recording and reproducing amplifiers are arranged on opposite sides of a rotary head disc. The corresponding magnetic recording and reproducing heads are mounted circumferentially equispaced on a lower radial surface.

Finally, it is known from the DE magazine "Fernseh- und Kino-Technik", Vol. 44, no. 3/1990, pp. 133 to 142, to arrange the magnetic recording and reproducing heads for four channels spaced 90° apart on a head disc. arrangement the magnetic heads are also situated on one side of the head disc.

It is the object of the present invention to reduce the crosstalk occurring between recording and reproducing channels in a scanning device of the type mentioned in the opening sentence.

SUMMARY OF THE INVENTION

This object is achieved in that a scanning device of the type described in the opening paragraph is characterized in that the rotary head includes first and second opposing major sides extending transverse to the axis of rotation of the head disc, and the reproducing heads are mounted on the first major side and the recording heads are mounted on the second, opposite major side.

The scanning device in accordance with the invention has the advantage that owing to the separation of the recording heads from the reproducing heads by mounting on opposite sides of the rotary head disc the magnetic recording and reproducing heads associated with the recording and reproducing channels are shielded from one another by the head. This enables the information recorded in an inclined track by means of a recording head to be read by means of a subsequent magnetic reproducing head for so-called off-tape monitoring, without the signal-to-noise ratio in the reproduction signal being degraded impermissibly by electric or magnetic fields.

The steps defined in the subsidiary Claims enable advantageous modifications and improvements of the scanning device defined in claim 1 to be obtained.

BRIEF DESCRIPTION OF THE INVENTION

An embodiment of the invention will now be described in more detail, by way of example, with reference to the drawings. In the drawings:

FIG. 1 is partly sectional view of a scanning device for a helical-scan magnetic-tape apparatus, FIG. 2a is a partly sectional side view of a head disc, and FIG. 2b is a plan view of the head disc in accordance with the invention.

DESCRIPTION OF THE PREFERRED EMBODIMENTS

Figure 1:
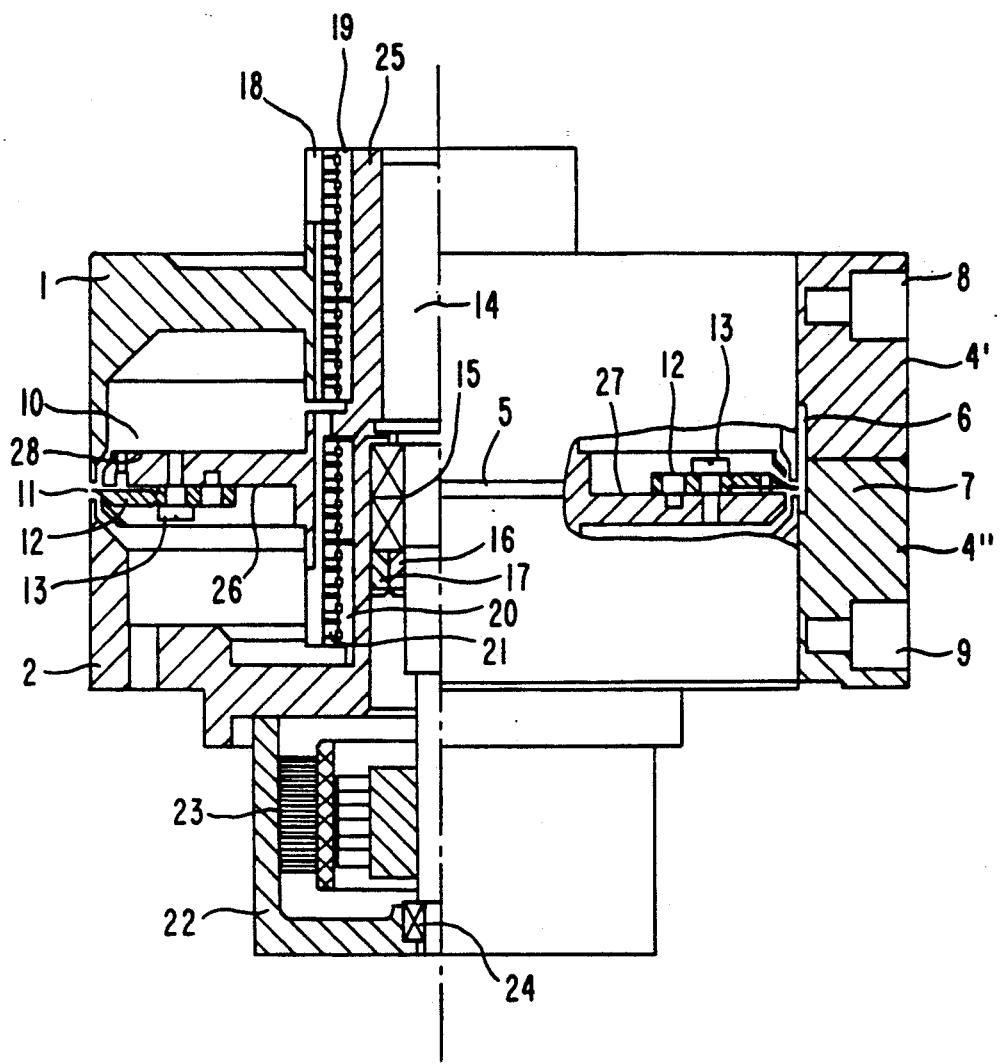

In FIGS. 1 and 2 like parts bear the same reference numerals. A stationary tape-guide drum 3 has a first (upper) drum section 1 and a second (lower) drum section 2. The upper drum section 1 and the lower drum section 2 are coaxially aligned and secured by means of prism-like drum guide 4' and 4", which is divided substantially at the level of a dividing gap 5 between the upper drum section 1 and the lower drum section 2 and which at the location 6 has a recess for the orbit of magnetic heads 11. The two parts 4' and 4" of the drum guide are interconnected by screw at 7. The parts 4' and 4" of the drum guide have bores 8 and 9 extending perpendicularly to the axial direction of the tape-guide drum 3. Screws (not shown) extend through these bores to pull the two drum sections 1 and 2 into a prism of the drum guide 4' and 4" and secure them.

A head disc 10, carrying the magnetic heads 11 at its periphery, rotates in the dividing gap 5. The individual heads 11 are arranged on head mounts 12, which are each secured to the head disc 10 by means of a screw 13. The head disc 10 is rotationally locked to a shaft 14, which is journalled in a duplex ball-bearing 15 at the level of the orbit of the rotating magnetic heads 11. The inner rings of the duplex ball-bearings 15 are secured by a nut 16 and the outer rings by a screw 17. The lower radial surface of the head disc 10 has segmental recesses 26. A mounting surface of a recess 26 carries a plurality of head mounts 12, which are each secured by means of the fixing screw 13 and which can be angularly aligned. For an axial alignment, i.e. height adjustment, of the magnetic head 11 on the head mount 12 the head disc 10 has a threaded bore 28 for a set-screw which acts upon the head mount 12. The upper radial surface of the head disc 10 has recesses 27 which are oriented oppositely to the recesses 26 and which also define mounting surfaces for the head mounts 12. The mounting surfaces of the recesses 26 and 27 are situated at the same level as the plane of the orbit of the magnetic heads 11. Further details on this are given with reference to FIG. 2a and 2b.

The recording signals, erase signals and operating voltages are transferred via rotary transformers comprising a stator section 18 and a rotor section 19. The rotor section 19 is non-positively connected to a mandrel 25 of the head disc 10. The stator section 18 is secured in an inner bore of the upper drum section 1. Spatially separated from the transformers 18 and 19 at the recording side a transfer device for reproducing signals is arranged underneath the head disc 10, which signals are induced in the magnetic reproducing heads 11 of the magnetic heads 11 when a magnetic tape (not shown) is scanned. The transfer device at the reproducing side comprises a stator section 20 and a rotor section 21. In contrast with transfer device arranged above the head disc 10 outer rings, instead of inner rings, of the rotary transformers arranged underneath the head disc 10 are rotationally locked to the rotary head disc 10, the inner rings of the rotary transformers being secured to an outer wall of the shaft bearing situated in the lower drum section 2. At their inner and outer diameters the individual magnet-core rings have grooves in which turns of the rotary transformers are embedded.

A housing 22 accommodating a motor 23 for driving the head disc 10 is coaxially secured to the underside of the lower drum section 2. The housing 22 also accommodates a bearing 24 for the shaft 14. The bearing 24 serves to stabilise the plane of the orbit of the magnetic heads 11.

Figure 2A:
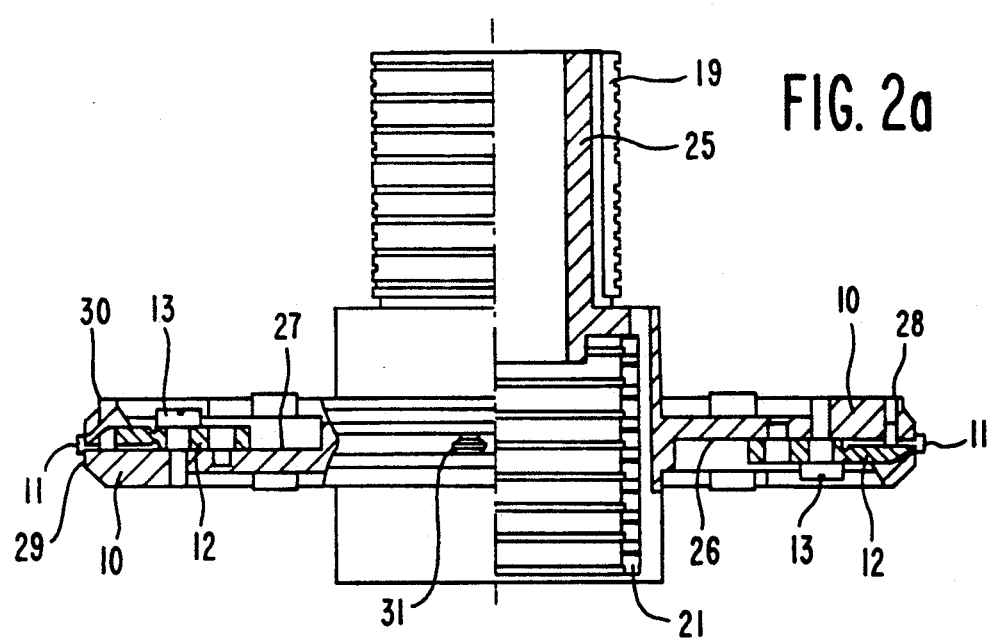

FIG. 2a shows the head-disc assembly removed from the shaft 14, which assembly comprises the head disc 10, the head mounts 12 with the magnetic head 11, the associated fixing screws 13, the mandrel 25, the inner rings of the rotor section 19 which are disposed above the head disc 10, and underneath it outer rings of the rotor section 21. To the right of the central axis the head-disc assembly is shown in sectional view and to the left thereof it is not shown in sectional view, the head disc 10 being again shown in sectional view at a line A-B. As is also visible in FIG. 1, the recesses 26 and 27 in the upper and the lower surface of the head disc 10 form mutually offset seats in which the head mounts 12 are secured. At its circumference the head disc 10 has windows 31 through which the head faces of the individual magnetic heads 11 extend. Thus, the magnetic heads 11 at the recording side and the reproducing side are fully shielded from one another. Moreover, the directly adjacent magnetic heads 11 are shielded and mechanically protected by the windows 31. For the tape guidance (head/tape contact) it is then found to be advantageous to select the outer diameter of the head disc 10 slightly smaller than the diameter of the stationary upper and lower drum sections 1, 2.

Figure 2B:
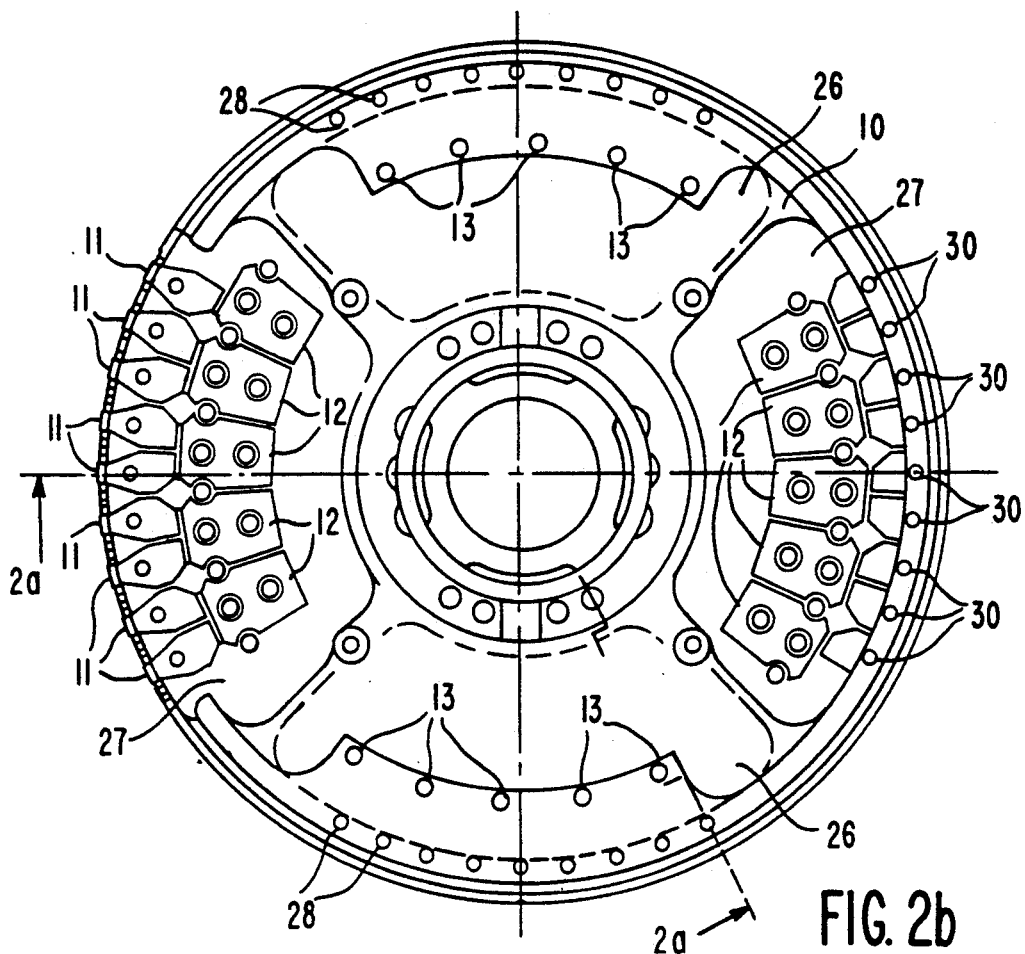

FIG. 2b shows a plan view of the rotary head disc 10. In this plan view the segmental recesses 27 accommodating the head mounts 12 are shown to the left and the right of the vertical diametral line. In the present example each of the five head mounts 12 in a segmental recess 27 comprises at least one tongue carrying a corresponding magnetic head 11. Both above and underneath the head disc the individual magnetic heads 11 are protected by an annular shield on the outer circumference. The individual tongues of the head mounts 12 can each be adjusted in the height direction by means of a set-screw (not shown for clarity). For this purpose the tongues of the head mounts 12 arranged in the recesses 27 have threaded bores 29 for receiving a set-screw. The individual set-screws are accessible through a suitably aligned hole 30 in the annular shield at the outer circumference. The tongues of the head mounts 12 arranged in the recesses 26 need not have threaded bores. The corresponding holes 30 are now formed as threaded bores 28 for receiving a set-screw each. This construction has the advantage that the height positions of all the magnetic heads arranged on the rotary head disc 10 can be adjusted from one side.

In its lower surface the head disc 10 has corresponding segmental recesses 26 for further head mounts 12, which recesses are spaced apart 90° from the recesses 27 in the upper surface. These head mounts are also secured by means of screws 13. The plan view of FIG. 2b shows the corresponding threaded bores for the screws 13. The relevant positions of the lower recesses 26 are indicated in broken lines. The recesses 26 accommodate magnetic recording heads and the recesses 27 accommodate magnetic reproducing heads, so the recesses 26 and 27, as well as the recording and reproducing heads, are also offset circumferentially from each other.

The physical separation between the rotary transformers, of the recording and reproducing amplifiers (not shown) and of the magnetic heads 11 by the head disc 10 and the consequent division of the signal transmission paths into a separate reproducing section and a separate recording section has the advantage that the head disc 10 now also isolates the magnetic recording and reproducing heads electrically and magnetically from one another, yielding an improved signal-to-noise ratio.

We claim:

1. A scanning device for a magnetic tape apparatus of the type having a rotary head disc rotatable about an axis of rotation and including a plurality of magnetic recording heads and a plurality of magnetic reproducing heads at the periphery of the disc, wherein the improvement comprises:
   the rotary head disc includes two opposing major sides extending transverse to the axis of rotation, and
   the reproducing heads are mounted on one of the major sides of the head disc and the recording heads are mounted on the other major side of said head disc, whereby the reproducing heads are separated from the recording heads by the head disc.

2. A scanning device according to claim 1, wherein each of the major sides includes segmental recesses having a seating surface on which the magnetic heads are mounted, and the seating surface on one major side of the disc is offset along the axis of rotation from the seating surface on the other major side of the disc.

3. A scanning device as claimed in claim 2, characterised in that the magnetic recording and reproducing heads are secured to head mounts, each head mount being secured to the head disc by means of a screw-thread connection and each head mount comprising at least one tongue for a magnetic head, which tongue is axially adjustable in height.

4. A scanning device as claimed in claim 3, characterised in that the individual tongues of the head mounts arranged in the recesses of the first major side of the disc include a threaded bore extending in the direction of the axis of rotation to receive a set-screw, and said head disc includes a shield at the outer circumference thereof with a hole in line with each threaded bore.

5. A scanning device as claimed in claim 4, characterised in that for the head mounts arranged in the recesses of the other major side, said head disc includes a shield at the outer circumference thereof having threaded bores extending in the direction of the axis of rotation to receive screws for the height adjustment of the individual magnetic heads, the threaded bores facing the individual tongues of the head mounts.

6. A scanning device as claimed in claim 5, characterised in that the scanning device includes first and second opposing stationary drum sections between which the rotary head disc is arranged and, in line with the magnetic heads arranged at the periphery of the head disc, one of the drum sections includes an access bore height adjustment of the magnetic heads.

7. A scanning device as claimed in claim 2, characterized in that the scanning device includes first and second opposing stationary drum sections having a gap therebetween, the rotary head disc is arranged in the gap, and in line with the magnetic heads arranged at the periphery of the head disc, one of the drum sections includes a bore for the height adjustment of the magnetic heads.

8. A scanning device as claimed in claim 2, characterised in that each of the magnetic heads includes a head face and the head disc includes an outer circumferential surface having windows through which the head faces extend and which laterally surround the individual magnetic heads.

9. A scanning device as claimed in claim 2, characterised in that the scanning device includes first and second opposing stationary drum sections between which the rotary head disc is arranged, and an outer diameter of the rotary head disc is smaller than an outer diameter of the stationary upper and lower drum section.

10. A scanning device as claimed in claim 2, characterized in that a major side the head disc includes a shield at the outer circumference thereof having threaded bores extending in the direction of the axis of rotation to receive screws for the height adjustment of the individual magnetic heads.

11. A scanning device according to claim 2, wherein the reproducing heads are arranged in two diametrically opposing segmental recesses in the one major side of the head disc and the reproducing heads are arranged in two diametrically opposing segmental recesses in the other major side of the head disc, and the segmental recesses in the one major side are offset in the circumferential direction of the head disc from the segmental recesses in the other major side.

12. A scanning device according to claim 2, further comprising a first rotary transformer for transferring signals to the recording heads and a second rotary transformer for transferring signals from the reproducing heads, said first rotary transformer being arranged in the scanning device adjacent the major side of the head disc on which the recording heads are mounted and said second rotary transformer is arranged adjacent the other major side of the head disc on which the reproducing heads are mounted, whereby the head disc isolates the recording heads and the first rotary transformer from the reproducing heads and the second rotary transformer.

13. A scanning device as claimed in claim 1, characterised in that each of the magnetic heads has a head face and the head disc includes an outer circumferential surface having windows through which the head faces extend and which laterally surround the individual magnetic heads.

14. A scanning device as claimed in claim 11, characterised in that the scanning device includes first and second opposing stationary drum sections between which the rotary head disc is arranged, and an outer diameter of the rotary head disc is smaller than an outer diameter of the stationary first and second drum sections.

15. A scanning device according to claim 1, wherein the recording heads are offset in the circumferential direction of the head disc from the reproducing heads.

16. A scanning device according to claim 1, further comprising a first rotary transformer for transferring signals to the recording heads and a second rotary transformer for transferring signals from the reproducing heads, said first rotary transformer being arranged in the scanning device adjacent the major side of the head disc on which the recording heads are mounted and said second rotary transformer is arranged adjacent the other major side of the head disc on which the reproducing heads are mounted, whereby the head disc isolates the recording heads and the first rotary transformer from the reproducing heads and the second rotary transformer.

* * * * *